United States Patent
Reydet et al.

(10) Patent No.: US 10,633,728 B2
(45) Date of Patent: Apr. 28, 2020

(54) IRON-NICKEL ALLOY HAVING IMPROVED WELDABILITY

(71) Applicant: APERAM, Luxembourg (LU)

(72) Inventors: Pierre-Louis Reydet, Urzy (FR); Fanny Jouvenceau, Saint Parize le Chatel (FR); Roland Panier, Nevers (FR)

(73) Assignee: Aperam, Luxembourg (LU)

( * ) Notice: Subject to any disclaimer, the term of this patent is extended or adjusted under 35 U.S.C. 154(b) by 310 days.

(21) Appl. No.: 15/125,935

(22) PCT Filed: Mar. 14, 2014

(86) PCT No.: PCT/IB2014/059819
§ 371 (c)(1),
(2) Date: Sep. 13, 2016

(87) PCT Pub. No.: WO2015/136333
PCT Pub. Date: Sep. 17, 2015

(65) Prior Publication Data
US 2017/0096727 A1    Apr. 6, 2017

(51) Int. Cl.
*C22C 38/08* (2006.01)
*B23K 35/30* (2006.01)
(Continued)

(52) U.S. Cl.
CPC ........... *C22C 38/08* (2013.01); *B21B 1/22* (2013.01); *B21B 3/00* (2013.01); *B23K 35/0261* (2013.01);
(Continued)

(58) Field of Classification Search
CPC ......... C22C 38/08; C22C 38/06; C22C 38/04; C22C 38/02; C22C 38/002; B23K 35/0261; B23K 35/3066
(Continued)

(56) References Cited

U.S. PATENT DOCUMENTS

| | | | | | |
|---|---|---|---|---|---|
| 1,912,968 | A | * | 6/1933 | Bull | B23K 35/40 219/145.1 |
| 3,723,106 | A | * | 3/1973 | Schlenker | C22C 19/03 148/312 |
| 5,783,145 | A | * | 7/1998 | Coutu | C22C 38/08 148/120 |
| 2001/0045246 | A1 | * | 11/2001 | Baudry | C22C 38/08 148/336 |

(Continued)

FOREIGN PATENT DOCUMENTS

| CN | 101100021 A | 1/2008 |
|---|---|---|
| CN | 102218448 A | 10/2011 |

(Continued)

OTHER PUBLICATIONS

International Search Report dated Jul. 22, 2015 in application No. PCT/IB2014/059819.

*Primary Examiner* — Thien S Tran
(74) *Attorney, Agent, or Firm* — Knobbe, Martens, Olson & Bear, LLP

(57) ABSTRACT

The invention relates to an alloy based on iron comprising, by weight:
$35\% \leq Ni \leq 37\%$
trace amounts $\leq Mn \leq 0.6\%$
trace amounts $\leq C \leq 0.07\%$
trace amounts $\leq Si \leq 0.35\%$
trace amounts $\leq Cr \leq 0.5\%$
trace amounts $\leq Co \leq 0.5\%$
trace amounts $\leq Mo < 0.5\%$
trace amounts $\leq S \leq 0.0035\%$
trace amounts $\leq O \leq 0.0025\%$
$0.011\% \leq [(3.138 \times Al + 6 \times Mg + 13.418 \times Ca) - (3.509 \times O + 1.770 \times S)] \leq 0.038\%$
$0.0003\% < Ca \leq 0.0015\%$
$0.0005\% < Mg \leq 0.0035\%$
$0.0020\% < Al \leq 0.0085\%$
the remainder being iron and residual elements resulting from the elaboration.

9 Claims, 1 Drawing Sheet

Figure 1:

(51) Int. Cl.
  *B21B 1/22* (2006.01)
  *B21B 3/00* (2006.01)
  *B23K 35/02* (2006.01)
  *C22C 38/00* (2006.01)
  *C22C 38/02* (2006.01)
  *C22C 38/04* (2006.01)
  *C22C 38/06* (2006.01)

(52) U.S. Cl.
  CPC ........ *B23K 35/3066* (2013.01); *C22C 38/002* (2013.01); *C22C 38/02* (2013.01); *C22C 38/04* (2013.01); *C22C 38/06* (2013.01); *B21B 2001/221* (2013.01); *B21B 2001/225* (2013.01); *B21B 2003/001* (2013.01)

(58) Field of Classification Search
  USPC ....... 29/592.1; 219/146.1; 420/94, 442, 459, 420/515, 582
  See application file for complete search history.

(56) References Cited

U.S. PATENT DOCUMENTS

| | | | | |
|---|---|---|---|---|
| 2006/0171840 A1* | 8/2006 | Gaben | ............... | C21D 8/0205 |
| | | | | 420/94 |
| 2013/0004883 A1* | 1/2013 | Miura | ............... | B21C 37/154 |
| | | | | 429/515 |

FOREIGN PATENT DOCUMENTS

| | | | | |
|---|---|---|---|---|
| CN | 103084753 A | | 5/2013 | |
| EP | 0713923 A1 | * | 5/1996 | ............ C22C 38/08 |
| EP | 0792943 A1 | | 9/1997 | |
| JP | 11061341 A | * | 3/1999 | ............ C21D 6/001 |
| JP | H11-61341 A | | 3/1999 | |
| JP | H11-92873 A | | 4/1999 | |
| JP | 11-264055 A | | 9/1999 | |
| JP | 2001-131706 A | | 5/2001 | |
| JP | 2007-331022 A | | 12/2007 | |
| JP | 2008-115466 A | | 5/2008 | |
| WO | 2004/063411 A1 | | 7/2004 | |

* cited by examiner

IRON-NICKEL ALLOY HAVING IMPROVED WELDABILITY

CROSS-REFERENCE TO RELATED APPLICATIONS

This application is the U.S. National Phase under 35 U.S.C. § 371 of International Application PCT/IB2014/059819, filed Mar. 14, 2014. The disclosure of which including the specification, the drawings, and the claims is hereby incorporated by reference in its entirety.

The present invention relates to an Fe—Ni alloy with a low thermal expansion coefficient intended to be used for making welded assemblies for applications in which high dimensional stability under the effect of temperature variations is required. The alloy according to the invention is more particularly intended to be used in cryogenic applications, and notably for making assemblies intended to contain liquefied gases, and notably tubes for transporting or tanks for transporting or storing liquefied gases.

Presently, such welded assemblies are made by using an iron-nickel alloy of the Invar® type as a base metal. Indeed, the Invar® are known for their low thermal expansion coefficient, and are therefore particularly suitable for the applications mentioned above.

However, presently used Fe—Ni alloys do not give entire satisfaction. Indeed, the inventors noticed that the welded assemblies made from these alloys had weld defects. In particular, they observed that the use of these alloys led to irregular welding seams and having islets of oxides at their surface.

An object of the present invention is to find a remedy to these drawbacks and to propose an Fe—Ni alloy with which welded assemblies may be made with great dimensional stability and having improved weldability.

For this purpose, the invention relates to an alloy based on iron comprising, by weight:
35%≤Ni≤37%
trace amounts≤Mn≤0.6%
trace amounts≤C≤0.07%
trace amounts≤Si≤0.35%
trace amounts≤Cr≤0.5%
trace amounts≤Co≤0.5%
trace amounts≤P≤0.01%
trace amounts≤Mo<0.5%
trace amounts≤S≤0.0035%
trace amounts≤O≤0.0025%
0.011%≤[(3.138×Al+6×Mg+13.418×Ca)−(3.509×O+1.770×S)]≤0.038%
0.0003%<Ca≤0.0015%
0.0005%<Mg≤0.0035%
0.0020%<Al≤0.0085%
the remainder being iron and residual elements resulting from the elaboration.

According to particular embodiments, the alloy according to the invention comprises one or several of the following features, taken individually or according to all the technically possible combination(s):
  the silicon content is greater than or equal to 0.1% by weight;
  the manganese content is greater than or equal to 0.15% by weight, the carbon content is greater than or equal to 0.02% by weight and the silicon content is greater than or equal to 0.1% by weight;
  the carbon content is less than or equal to 0.05% by weight;
  the calcium content is less than or equal to 0.0010% by weight;
  the magnesium content is less than or equal to 0.0020% by weight; and
  the aluminium content is comprised between 0.0030% and 0.0070% by weight.

The invention also relates to a method for manufacturing a strip made in an alloy as defined earlier, the method comprising the following successive steps:
an alloy is elaborated as defined earlier;
a semi-finished product of said alloy is formed;
this semi-finished product is hot-rolled in order to obtain a hot strip;
the hot strip is cold-rolled in one or several passes in order to obtain a cold strip.

The invention also relates to a strip made in an alloy as defined earlier.

The invention also relates to a method for manufacturing a welding wire comprising the following successive steps:
an alloy is elaborated as defined earlier;
a semi-finished product of said alloy is formed;
this semi-finished product is hot-rolled in order to manufacture an initial wire;
the initial wire is cold-drawn in order to obtain the welding wire.

The invention also relates to a welding wire made in an alloy as defined earlier.

The invention also relates to the use of an alloy based on iron comprising, by weight:
35%≤Ni≤37%
0.15%≤Mn≤0.6%
0.02%≤C≤0.07%
0.1%≤Si≤0.35%
trace amounts≤Cr≤0.5%
trace amounts≤Co≤0.5%
trace amounts≤P≤0.01%
trace amounts≤Mo<0.5%
trace amounts≤S≤0.0035%
trace amounts≤O≤0.0025%
0.011%≤[(3.138×Al+6×Mg+13.418×Ca)−(3.509×O+1.770×S)]≤0.038%
0.0003%<Ca≤0.0015%
0.0005%<Mg≤0.0035%
0.0020%<Al≤0.0085%
the remainder being iron and residual elements resulting from the elaboration, in order to manufacture tanks or tubes intended to receive a liquefied gas.

Figure 2:
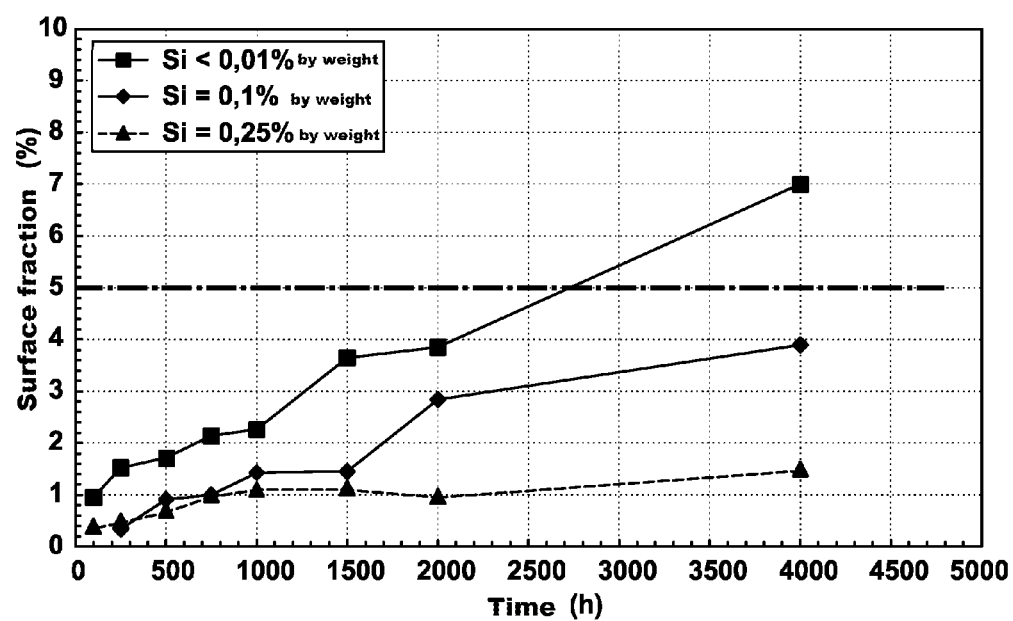

The invention will be better understood upon reading the description which follows, only given as an example, and made with reference to the appended drawings, wherein:

FIG. 1 is an image, taken with an optical microscope, of a part having filamentary corrosion; and FIG. 2 is a graph showing the results of experiments conducted by the inventors.

In the whole description, the contents are given as weight percentages. Moreover, the Al, Mg, Ca, S and O contents correspond to the total contents of these elements in the alloy.

The alloy according to the invention is an iron-based alloy comprising, by weight:
35%≤Ni≤37%
trace amounts≤Mn≤0.6%
trace amounts≤C≤0.07%
trace amounts≤Si≤0.35%
trace amounts≤Mo<0.5%
trace amounts≤Co≤0.5%
trace amounts≤Cr≤0.5% trace amounts≤P≤0.01%
trace amounts≤S≤0.0035%
trace amounts≤O≤0.0025%
0.011%≤[(3.138×Al+6×Mg+13.418×Ca)−(3.509×O+1.770×S)]≤0.038%
0.0003%<Ca≤0.0015%
0.0005%<Mg≤0.0035%
0.0020%<Al≤0.0085%
the remainder being iron and residual elements resulting from the elaboration.

The alloy according to the invention is an alloy of the Invar® type.

By residual elements resulting from the elaboration, are meant elements which are present in the raw materials used for elaborating the alloy or which stem from the apparatuses used for its elaboration, and for example refractory materials of ovens. These residual elements do not have any metallurgical effect on the alloy.

The residual elements in particular comprise elements from the family of lead (Pb), which are reduced to a minimum in order to limit the sensitivity of the alloy to solidification cracks and to avoid degradation of the weldability.

Phosphorus (P), molybdenum (Mo), sulfur (S) and oxygen (O) are impurities resulting from the elaboration for which the total amounts present in the alloy should be limited to contents below the specified contents.

In the alloy according to the invention, the carbon content is limited in order to avoid precipitation of carbides of the MC type wherein M is a residual element which may be associated with carbon for forming carbides, such as titanium (Ti), niobium (Nb), vanadium (V), zirconium (Zr). Indeed, some carbides degrade the resistance of the alloy to hot cracking. The carbon content is also limited in order to limit the formation of porosities during welding by effervescence.

The alloy according to the invention further has a low average thermal expansion coefficient, in particular of less than or equal to $2.10^{-6}$ $K^{-1}$ between −180° C. and 0° C., and advantageously less than or equal to $1.5.10^{6\circ}$ $K^{-1}$ between −180° C. and 0° C., and less than or equal to $2.5.10^{-6}$ $K^{-1}$ between 20° C. and 100° C.

Further, it is stable towards martensitic transformation as far as below the liquefaction temperature of nitrogen (−196° C.). In particular, its contents of gammagenic elements, i.e. nickel (Ni), manganese (Mn) and carbon (C), are adjusted so that its metallurgical structure is stable at 4.2 Kelvins (liquefaction temperature of helium) in the absence of any plastic deformation or that its volume fraction of martensite remains less than or equal to 5% when it is subject to a 25% deformation by planar traction interrupted at −196° C.

The contents of cobalt (Co), manganese (Mn) and silicon (Si) in the alloy are limited in order to avoid degradation of the stability of the alloy towards martensitic transformation, as well as the average expansion coefficient between −180° C. and 0° C.

The alloy according to the invention has a low elastic modulus, in particular less than 150,000 MPa.

It does not have any "ductile-fragile" resilience transition. More particularly, it has a resilience at −196° C. greater than 150 joules/cm², and in particular greater than 200 joules/cm².

These properties make it particularly suitable for applications wherein dimensional stability under the effect of temperature variations is required.

In the alloy according to the invention, the sulfur (S) and oxygen (O) contents are reduced as much as possible for improving the capability of hot transformation of the alloy. In particular, it is sought to reduce as much as possible the sulfur (S) and oxygen (O) contents in solid solution in the alloy.

This limitation of the oxygen and sulfur contents in solid solution is notably obtained by adding silicon, which acts as a deoxidizer and indirectly as a desulfurizer via chemical reactions between the liquid metal and the slag during the elaboration of the alloy. Indeed it is known that the sulfur content % S of the liquid metal of an alloyed steel verifies, during the refining operation in a liquid phase, the following relationship:

$$\%\underline{S} = (\%S) \cdot \frac{a_0}{C'_s}$$

wherein
(% S) is the sulfur content of the slag
$C'_s$ is the sulfur capacity of the slag
$a_0$ is the activity of the oxygen of the liquid metal
Manganese participates in the desulfurization in solid phase.

Moreover, the inventors noticed that too high calcium, aluminium and magnesium contents were detrimental to the weldability of the alloy. Therefore, the contents of these elements should be limited. More particularly, the inventors of the present invention discover that when:
(a1) the calcium content is less than or equal to 0.0015%,
(b1) the magnesium content is less than or equal to 0.0035%
(c1) the aluminium content is less than or equal to 0.0085%,
and when, moreover the aluminium, magnesium, calcium, oxygen and sulfur contents in the alloy observe the following relationship:

$$[(3.138 \times Al + 6 \times Mg + 13.418 \times Ca) - (3.509 \times O + 1.770 \times S)] \leq 0.038\% \quad (d1).$$

the weld beads made on parts made in the alloy according to the invention are regular.

On the contrary, when the relationships (a1), (b1), (c1) and (d1) above are not observed, the weld beads are irregular.

The inventors believe that the regularity of the beads in the alloy according to the invention results from the fact that, for the specified contents, the electric arc of the welding tool is stable on the one hand, and the surface of the beads is without any oxide aggregates on the other hand. On the contrary, when the alloy contains contents of these elements above specified limits, the electric arc of the welding tool is unstable, but also, oxide islets pin the base of the beads, which results in variable bead widths, and therefore in irregular beads. The inventors believe that this pinning notably stems from variations of surface energy of the melted area when the calcium, aluminium and magnesium do not observe the relationships above. By pinning of the base of the beads, is meant that the base of the beads cannot migrate, it remains immobile, blocked out of an equilibrium condition. If the pinning force disappears, the base of the beads is able to move in order to converge towards its equilibrium condition.

Preferably,
the calcium content is less than or equal to 0.0010% by weight; and/or
the magnesium content is less than or equal to 0.0020% by weight; and/or the aluminium content is less than or equal to 0.0070% by weight.

However, the inventors of the present invention noticed that when, according to the invention:

(a2) the calcium content (Ca) is strictly greater than 0.0003% by weight, (b2) the magnesium content (Mg) is strictly greater than 0.0005% by weight, (c2) the aluminium content (Al) is strictly greater than 0.0020% by weight, and when, moreover, the total contents of aluminium, magnesium, calcium, sulfur and oxygen in the alloy observe the following relationship:

$$[(3.138 \times Al + 6 \times Mg + 13.418 \times Ca) - (3.509 \times O + 1.770 \times S)] \geq 0.011\%, \quad (d2)$$

the obtained alloy has good resistance to hot cracking.

In particular, the alloy according to the invention develops a total length of cracks of less than or equal to 10 mm (+/−0.5 mm) during a Varestraint test conducted according to the European standard FD CEN ISO/TR 17641-3 under a plastic deformation of 3.2%.

On the contrary, the inventors observe that when the relationships (a2), (b2), (c2) and (d2) above are not observed, the alloy has a resistance to hot cracking which is not satisfactory. In particular, the alloy then develops a total length of cracks greater than 10 mm (+/−0.5 mm) during a Varestraint test as mentioned above.

Preferably, the aluminium content is greater than or equal to 0.0030%.

The inventors believe that, in the alloy according to the invention, this improvement in the resistance to hot cracking stems from the presence, in limited amounts, of calcium, magnesium and aluminium in the alloy at contents allowing these elements to trap residual sulfur and oxygen as sulfides and/or oxides in liquid phase.

It will be noted that the expression: $[(3.138 \, Al + 6 \, Mg + 13.418 \, Ca) - (3.509 \, O + 1.770 \, S)]$, developed by the inventors of the present invention, compares the contents of calcium, magnesium and aluminium with those of oxygen and sulfur. It expresses the idea according to which the amount of calcium, magnesium and aluminium which degrades the weldability corresponds to the fraction of the total contents of Ca, Mg and Al which corresponds to the amount of these elements present in solid solution in the alloy, i.e., not precipitated as oxides or sulfides.

The weighted coefficients of calcium, magnesium and of aluminium in this relationship express the relative affinity of each of these elements with sulfur and oxygen as ascertained by the inventors, i.e. the capability of each of these elements of trapping sulfur and oxygen in order to form sulfides or oxides.

In this expression, Al, Mg, Ca, O and S correspond to the total contents of these elements in the alloy, expressed as weight percentages.

It will be noted that calcium, magnesium and aluminium are usually considered as simple impurities in the alloys falling within the field of the invention. However, as explained above, the inventors of the present invention noticed that these elements may have the beneficial effects indicated above when they are present in small amounts in the alloy, i.e. in the specified ranges.

Taking into account the foregoing, the alloy according to the invention allows producing welded assemblies made of Invar® which do not have the welding defects observed in the case of the alloys customarily used.

Preferably, the alloy according to the invention comprises:

0.15% ≤ Mn ≤ 0.6%

0.02% ≤ C ≤ 0.07%

0.1% ≤ Si ≤ 0.35%.

This alloy is particularly suitable for cryogenic applications, i.e. notably the transport and the storage of liquefied gases, such as liquid hydrogen, liquid nitrogen, liquid methane or liquid propane.

In particular, the manganese (Mn) and carbon (C) contents respectively greater than or equal to 0.15% and 0.02% improve the stability of the alloy towards martensitic transformation at −196° C.

Moreover, the inventors discovered that the silicon present in the alloy at contents greater than 0.10% improves the resistance of the alloy to filamentary corrosion by formation of a cortical silicon oxide layer developed by means of a suitable final heat treatment.

The filamentary corrosion results from the extended contact of the alloy with the atmosphere. It in particular occurs under the effect of oxygen and of the pollutants of the air, as well as of the water vapor. In English, the filamentary corrosion is also designated by the term of "filiform corrosion". FIG. 1 illustrates an example of filamentary corrosion.

The alloy according to the invention may be elaborated by any suitable method known to one skilled in the art. As an example, it is elaborated in an electric arc furnace, and then is refined in a ladle by usual methods, which may in particular comprise a step of placing under reduced pressure. Alternatively, the alloy according to the invention is elaborated in a vacuum furnace from starting materials with a low content of residual elements.

For example cold strips are then manufactured from the thereby elaborated alloy. As an example, the following method is used for manufacturing such cold strips.

The alloy is cast as semi-finished products such as ingots, remelted electrodes, slabs, notably thin slabs with a thickness of less than 180 mm, or billets.

When the alloy is casted as a remelted electrode, the latter is advantageously remelted in vacuo or under an electro-conductive slag in order to obtain better purity and more homogeneous semi-finished products.

The thereby obtained semi-finished product is then hot-rolled at a temperature comprised between 950° C. and 1300° C. in order to obtain a hot strip. The thickness of the hot strip is notably comprised between 2 mm and 6 mm.

According to an embodiment, the hot-rolling is preceded with a chemical homogenization heat treatment at a temperature comprised between 950° C. and 1300° C. for a period comprised between 30 minutes to 24 hours.

The hot strip is then cooled to room temperature in order to form a cooled strip, and then wound into coils.

The cooled strip is then cold-rolled in order to obtain a cold strip having a final thickness advantageously comprised between 0.5 mm and 2 mm. The cold-rolling is carried out in one pass or in several successive passes.

At the final thickness, the cold strip is subject to a recrystallization heat treatment in a static oven for a period ranging from 10 minutes to several hours and at a temperature above 700° C. Alternatively, it is subject to a recrystallization heat treatment in a continuous annealing oven for a period ranging from a few seconds to about 1 minute, at a temperature above 800° C., in the holding area of the oven, and under a protected atmosphere of the $N_2/H_2$ type (30%/70%) with a frost temperature comprised between −50° C. and −15° C.

A recrystallization heat treatment may be carried out, under the same conditions, during cold-rolling, at an intermediate thickness between the initial thickness (corresponding to the thickness of the hot strip) and the final thickness. The intermediate thickness is for example selected to be equal to 1.5 mm when the final thickness of the cold strip is 0.7 mm.

The methods for elaborating the alloy and for manufacturing cold strips made of this alloy are only given as an example.

Any other methods for elaborating the alloy according to the invention and for manufacturing finished products made of this alloy known to one skilled in the art may be used for this purpose.

Tests

The inventors carried out laboratory castings of alloys having Ni, Mn, C, Si, Co, Cr, Mo, S, O and P contents in the specified ranges, and Ca, Mg and Al contents varying between a few ppm and approximately 0.001%. The thereby obtained ingots were hot formed by rolling in order to produce plates a few millimeters thick. These plates were then machined in order to obtain a surface without any hot oxidation.

The alloy compositions of each of the tested plates are described in the table hereafter.

The inventors made, on the thereby obtained plates, fusion lines with the TIG (Tungsten Inert Gas) method in order to show the incidence of calcium, magnesium and aluminium on the regularity of the weld beads. The results of these tests are described in the column entitled «TIG fusion line» in the table hereafter.

The width of the weld beads was measured by optical microscopy and the regularity of the beads was defined as follows:

$$\text{Regularity} = 100 \times (L\text{max} - L\text{min})/L\text{max} \quad (1),$$

wherein $L\text{min}$ corresponds to the minimum measured width of the weld bead and $L\text{max}$ corresponds to the maximum measured width of the weld bead.

It was considered that the regularity of the weld bead was good (Index 1 in the table hereafter) when the regularity calculated by applying formula (1) is less than or equal to 2.5%.

It was considered that the regularity of the weld bead was acceptable (Index 2 in the table hereafter) when the regularity calculated by applying formula (1) is comprised between 2.5% and 5%.

It was considered that the regularity of the weld bead was poor (Index 3 in the table hereafter) when the regularity calculated by applying formula (1) is strictly greater than 5%.

Moreover, the inventors conducted on the obtained plates Varestraint tests according to the FD CEN ISO/TR 17641-3 European standard under 3.2% of plastic deformation in order to evaluate their resistance to hot cracking. They measured the total length of cracks developed during the test, and classified the plates in two categories:
- the plates having, at the end of the test, a total length of cracks of less than or equal to 10 mm+/−0.5 mm were considered as having good resistance to hot cracking, while
- the plates having a total length of the cracks strictly greater than 10 mm+/−0.5 mm were considered as having insufficient resistance to hot cracking.

The results of these tests are described in the column entitled "Varestraint Tests with 3.2% deformation" of the table hereafter. In this column, the plates having good resistance to hot cracking are those which have a total length of cracks noted as «1 to 10», while the plates having insufficient resistance to hot cracking are those which have a total length of cracks noted as «10 to 15».

In the table hereafter, the «behavior law» column shows the value taken by the expression: $[(3.138 \times Al + 6 \times Mg + 13.418 \times Ca) - (3.509 \times O + 1.770 \times S)]$ for the relevant alloy, wherein Al, Mg, Ca, O and S respectively designate the total contents of Al, Mg, Ca, O and S in weight percentages in the alloy.

| Alloy | | Fe | Ni | Mn | C | Si | Ca | Mg | Al | S | O | TIG fusion line Regularity of the bead 1 = Good 2 = Acceptable 3 = Poor | Varestraint tests with 3.2% deformation Total length of cracks (mm) | Behavior law |
|---|---|---|---|---|---|---|---|---|---|---|---|---|---|---|
| A | Low | remainder | 36 | 0.35 | 0.03 | 0.15 | 0.0005 | 0.0015 | 0.0075 | 0.0003 | 0.0010 | 1 | 1 to 10 | 0.035 |
| B | Sulfur | | 36 | 0.35 | 0.03 | 0.15 | 0.0008 | 0.0010 | 0.0045 | 0.0005 | 0.0011 | 1 | 1 to 10 | 0.026 |
| C | | | 36 | 0.35 | 0.03 | 0.15 | 0.0015 | 0.0015 | 0.0040 | 0.0004 | 0.0010 | 2 | 1 to 10 | 0.037 |
| D | | | 36 | 0.35 | 0.03 | 0.15 | 0.0023 | 0.0010 | 0.0038 | 0.0005 | 0.0012 | 3 | 1 to 10 | 0.044 |
| E | | | 36 | 0.35 | 0.03 | 0.15 | 0.0050 | 0.0020 | 0.0035 | 0.0004 | 0.0010 | 3 | 1 to 10 | 0.086 |
| F | Low | remainder | 36 | 0.36 | 0.02 | 0.22 | 0.0005 | 0.0010 | 0.0045 | 0.0005 | 0.0011 | 1 | 1 to 10 | 0.022 |
| G | Sulfur | | 36 | 0.36 | 0.02 | 0.22 | 0.0005 | 0.0025 | 0.0045 | 0.0005 | 0.0020 | 1 | 1 to 10 | 0.028 |
| H | | | 36 | 0.36 | 0.02 | 0.22 | 0.0005 | 0.0035 | 0.0050 | 0.0007 | 0.0010 | 2 | 1 to 10 | 0.038 |
| I | | | 36 | 0.36 | 0.02 | 0.22 | 0.0005 | 0.0040 | 0.0055 | 0.0005 | 0.0010 | 3 | 1 to 10 | 0.043 |
| J | | | 36 | 0.36 | 0.02 | 0.22 | 0.0005 | 0.0056 | 0.0030 | 0.0005 | 0.0010 | 3 | 1 to 10 | 0.045 |
| K | Low | remainder | 36 | 0.35 | 0.03 | 0.25 | 0.0005 | 0.0015 | 0.0025 | 0.0003 | 0.0009 | 1 | 1 to 10 | 0.020 |
| L | Sulfur | | 36 | 0.35 | 0.03 | 0.25 | 0.0004 | 0.0010 | 0.0045 | 0.0003 | 0.0012 | 1 | 1 to 10 | 0.020 |
| M | | | 36 | 0.35 | 0.03 | 0.25 | 0.0005 | 0.0015 | 0.0065 | 0.0005 | 0.0013 | 2 | 1 to 10 | 0.030 |
| N | | | 36 | 0.35 | 0.03 | 0.25 | 0.0005 | 0.0015 | 0.0085 | 0.0003 | 0.0009 | 2 | 1 to 10 | 0.038 |
| O | | | 36 | 0.35 | 0.03 | 0.25 | 0.0005 | 0.0030 | 0.0110 | 0.0005 | 0.0010 | 3 | 1 to 10 | 0.054 |
| P | High | remainder | 36 | 0.33 | 0.03 | 0.18 | 0.0023 | 0.0056 | 0.0100 | 0.0010 | 0.0013 | 3 | 1 to 10 | 0.079 |
| R | Sulfur | | 36 | 0.33 | 0.03 | 0.18 | 0.0003 | 0.0005 | 0.0050 | 0.0030 | 0.0010 | 1 | 10 to 15 | 0.010 |
| S | | | 36 | 0.33 | 0.03 | 0.18 | 0.0005 | 0.0007 | 0.0045 | 0.0030 | 0.0010 | 1 | 1 to 10 | 0.012 |
| T | | | 36 | 0.33 | 0.03 | 0.18 | 0.0007 | 0.0010 | 0.0040 | 0.0025 | 0.0010 | 1 | 1 to 10 | 0.016 |
| U | | | 36 | 0.33 | 0.03 | 0.18 | 0.0005 | 0.0007 | 0.0010 | 0.0027 | 0.0012 | 1 | 10 to 15 | 0.004 |
| V | | | 36 | 0.33 | 0.03 | 0.18 | 0.0007 | 0.0009 | 0.0017 | 0.0030 | 0.0012 | 1 | 10 to 15 | 0.008 |
| W | | | 36 | 0.33 | 0.03 | 0.18 | 0.0025 | 0.0015 | 0.0055 | 0.0018 | 0.0012 | 3 | 1 to 10 | 0.045 |

In the table above, the examples which are not according to the invention are noted in bold characters.

In the group of examples referenced from A to E, the calcium content was varied between 0.0005% and 0.0050% while retaining substantially constant silicon, magnesium, aluminium, sulfur and oxygen contents, in order to evaluate the effect of calcium on the regularity of the weld bead and on the hot cracking of the alloy.

In the group of examples referenced from F to J, the magnesium content was varied between 0.0010% and 0.0056% while retaining substantially constant silicon, calcium, aluminium, sulfur and oxygen contents, in order to evaluate the effect of magnesium on the regularity of the weld bead and on the hot cracking of the alloy.

In the group of examples referenced from K to O, the aluminium content was varied between 0.0025% and 0.0110% while retaining substantially constant silicon, calcium, magnesium, sulfur and oxygen contents in order to evaluate the effect of aluminium on the regularity of the weld bead and on the hot cracking of the alloy.

In the group of examples referenced from P to W, alloys having a higher sulfur contents than in the groups of preceding examples were evaluated in order to determine the lower limits of the contents of each of the Ca, Al and Mg elements which allow avoiding hot cracking.

In the examples referenced as D, E, I, J, O, P and W, the relationship (3.138×Al+6×Mg+13.418×Ca)−(3.509×O+1.770×S) assumes values greater than the upper limiting value of 0.038% defined in the composition of the alloy. Now, it is observed that in these examples, the weld bead has regularity considered as poor (index 3), while the resistance to cracking of the alloy resulting from the Varestraint test is good (length of the cracks comprised between 1 and 10 mm).

In the examples R, U and V, the relationship (3.138×Al+6×Mg+13.418×Ca)−(3.509×O+1.770×S) assumes values less than the lower limit boundary of 0.011 as specified. Now, it is observed that, in these examples, the weld bead obtained has a good regularity (index 1), but the resistance to cracking of the alloy is poor.

In all the other examples, the relationship (3.138×Al+6×Mg+13.418×Ca)−(3.509×O+1.770×S) assumes values comprised between the lower limit of 0.011% and the upper limit of 0.038%, as specified. It is observed that the alloy has a resistance to cracking considered as good (total length of the cracks comprised between 0 and 10 mm) and that the weld beads obtained are regular.

Thus, by a very specific control of the calcium, aluminium and magnesium contents in a range of very low contents and by observing the relationships (d1) and (d2) between these elements, sulfur and oxygen, an Fe—Ni alloy is obtained having a low thermal expansion coefficient, and which further has excellent metallurgical weldability. Thus, the alloy according to the invention may advantageously be used as a base metal for producing welded assemblies with great dimensional stability.

In order to verify the effect of the silicon content on the sensitivity to filamentary corrosion, the inventors also conducted experiments on sheets made of alloys (a), (b) and (c) having Ni, Mn, C, Co, Cr, Mo, S, O, P, Ca, Mg and Al contents in the specified ranges, but variable silicon contents.

Thus, the alloy (a) has a silicon content strictly less than 0.01% by weight, the alloy (b) has a silicon content equal to 0.1% by weight and the alloy (c) has a silicon content equal to 0.25% by weight.

These sheets were subject to an industrial recrystallization heat treatment under $H_2$ with a frost temperature comprised between −50° C. and −15° C., and then were left for 4000 h in a weathering chamber at 55° C. under 95% of relative humidity.

The surface filamentary corrosion fraction was then measured by automatic analysis of images captured by means of an optical microscope at a magnification of 200.

FIG. 2 is a graph illustrating the results of the experiments conducted by the inventors. These results show that, in the case of examples (a) and (b), in which the silicon content is greater than or equal to 0.1%, the surface filamentary corrosion fraction remains less than 5% under the conditions mentioned above. On the contrary, in the case of example (a), wherein the silicon content is strictly less than 0.1%, the surface filamentary corrosion fraction becomes greater than 5% under the conditions mentioned above.

Thus, the alloys having a silicon content greater than or equal to 0.1% have better resistance to filamentary corrosion than alloys having silicon contents strictly less than 0.1%.

The alloy according to the invention may also be used for manufacturing a welding wire. Such a welding wire has all the advantages mentioned above in terms of resistance to cracking and of regularity of the weld beads obtained when the wire is used as a welding. Moreover, the weld bead obtained will have a low thermal expansion coefficient low.

As an example, such a welding wire is made by the following method. The alloy is elaborated by for example using the elaboration methods described herein before. Next, this alloy is cast into semi-finished products and notably into billets. These semi-finished products are then hot-rolled in order to obtain an initial wire, also called a machine wire. Such a machine wire generally has a diameter comprised between 4 mm and 6 mm. Next, the initial wire is cold-drawn in order to reduce the diameter and obtain the welding wire. The diameter of the welding wire is preferably comprised between 0.5 mm and 1.5 mm.

What is claimed is:

1. An iron-based alloy comprising, by weight:
   35%≤Ni≤37%
   0.15%≤Mn≤0.6%
   0.02%≤C≤0.07%
   0.1%≤Si≤0.35%
   Cr≤0.5%
   Co≤0.5%
   P≤0.01%
   Mo<0.5%
   S≤0.0035%
   O≤0.0025%
   0.011%≤[(3.138×Al+6×Mg+13.418×Ca)−(3.509×O+1.770×S)]≤0.038%
   0.0003%<Ca≤0.0015%
   0.0005%<Mg≤0.0035%
   0.0020%<Al≤0.0085%
   the remainder being iron and residual elements resulting from the elaboration.

2. The alloy according to claim 1, wherein the calcium content is less than or equal to 0.0010% by weight.

3. The alloy according to claim 1, wherein the magnesium content is less than or equal to 0.0020% by weight.

4. The alloy according to claim 1, wherein the aluminium content is comprised between 0.0030% and 0.0070% by weight.

5. A strip comprising the alloy according to claim 1.

6. A method for manufacturing a welding wire comprising the following successive steps:

providing material comprising the alloy according to claim 1;

forming the material into a semi-finished product;

hot-rolling this semi-finished product in order to manufacture an initial wire;

cold-drawing the initial wire in order to obtain the welding wire.

7. A welding wire comprising the alloy according to claim 1.

8. A tank or a tube for receiving a liquefied gas, comprising the alloy according to claim 1.

9. A method for manufacturing a strip according to claim 5, comprising the following successive steps:

providing material comprising the alloy;

forming the material into a semi-finished product;

hot-rolling this semi-finished product in order to obtain a hot strip;

cold-rolling the hot strip in one or several passes in order to obtain a cold strip.

* * * * *